(12) United States Patent
Orlando et al.

(10) Patent No.: US 7,186,073 B2
(45) Date of Patent: Mar. 6, 2007

(54) COUNTER-ROTATING GAS TURBINE ENGINE AND METHOD OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 10/976,525

(22) Filed: Oct. 29, 2004

(65) Prior Publication Data

US 2006/0093468 A1    May 4, 2006

(51) Int. Cl.
*F01D 1/24* (2006.01)

(52) U.S. Cl. .......................... 415/65; 415/69; 415/229; 29/889.21

(58) Field of Classification Search .................. 415/65, 415/68, 69, 229; 416/122, 128; 60/39.162; 29/889.21
See application file for complete search history.

(56) References Cited

U.S. PATENT DOCUMENTS

| | | | |
|---|---|---|---|
| 5,307,622 A | * | 5/1994 | Ciokajlo et al. ......... 60/39.162 |
| 5,806,303 A | | 9/1998 | Johnson |
| 5,809,772 A | | 9/1998 | Giffin, III et al. |
| 5,813,214 A | | 9/1998 | Moniz et al. |
| 5,820,345 A | * | 10/1998 | Giffin et al. ................ 416/128 |
| 5,867,980 A | | 2/1999 | Bartos |
| 6,619,030 B1 | | 9/2003 | Seda et al. |
| 6,684,626 B1 | | 2/2004 | Orlando et al. |
| 6,711,887 B1 | | 3/2004 | Orlando et al. |
| 6,732,502 B1 | | 5/2004 | Seda et al. |
| 6,739,120 B1 | | 5/2004 | Moniz et al. |
| 6,763,652 B1 | | 7/2004 | Baughman et al. |
| 6,763,653 B1 | | 7/2004 | Orlando et al. |
| 6,763,654 B1 | | 7/2004 | Orlando et al. |

* cited by examiner

*Primary Examiner*—Edward K. Look
*Assistant Examiner*—Devin Hanan
(74) *Attorney, Agent, or Firm*—William Scott Andes; Armstrong Teasdale LLP

(57) ABSTRACT

A method for assembling a gas turbine engine includes providing a low-pressure turbine inner rotor that includes at least a first pair of adjacent rows of turbine blades that are configured to rotate in a first direction providing a low-pressure turbine outer rotor that includes a forward end, an aft end, and at least one row of turbine blades that is rotatably coupled between the first pair of inner rotor turbine blades, wherein the at least one row of outer rotor turbine blades is configured to rotate in a second direction that is opposite the first direction, and coupling a support assembly between the first pair of inner rotor turbine blades such that the support assembly supports the outer rotor forward end.

17 Claims, 4 Drawing Sheets

COUNTER-ROTATING GAS TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased inlet radius accommodates additional rotor stages within the low-pressure turbine. Specifically, at least one known counter-rotating low-pressure turbine includes an outer rotor having a first quantity of stages that are rotatably coupled to the forward fan assembly, and an inner rotor having an equal number of stages that is rotatably coupled to the aft fan assembly.

During engine assembly, at least some of such known gas turbine engines are assembled such that the outer rotor is cantilevered from the turbine rear-frame. More specifically, the first quantity of rows stages are each coupled together and to the rotating casing to form the outer rotor. The outer rotor is then coupled to the turbine rear-frame using only the last stage of the outer rotor, such that only the last stage of the outer rotor supports the combined weight of the outer rotor and the rotating casing. Accordingly, to provide the necessary structural strength to such engines, the last stage of the outer rotor is generally much larger and heavier than the other stages of the outer rotor. As such, during operation, the performance penalties associated with the increased weight and size of the last rotor stage may actually negate the benefits of utilizing a counter-rotating low-pressure turbine.

BRIEF DESCRIPTION OF THE INVENTION

In one aspect, a method for assembling a gas turbine is provided. The method includes providing a low-pressure turbine inner rotor that includes at least a first pair of adjacent rows of turbine blades that are configured to rotate in a first direction providing a low-pressure turbine outer rotor that includes a forward end, an aft end, and at least one row of turbine blades that is rotatably coupled between the first pair of inner rotor turbine blades, wherein the at least one row of outer rotor turbine blades is configured to rotate in a second direction that is opposite the first direction, and coupling a support assembly between the first pair of inner rotor turbine blades such that the support assembly supports the outer rotor forward end.

In another aspect, a low-pressure turbine is provided. The low-pressure turbine includes an inner rotor comprising at least a first pair of adjacent rows of turbine blades that are configured to rotate in a first direction, a low-pressure turbine outer rotor including a forward end, an aft end, and at least one row of turbine blades that is rotatably coupled between the first pair of inner rotor turbine blades, wherein the at least one row of outer rotor turbine blades is configured to rotate in a second direction that is opposite the first direction, and a support assembly coupled between the first pair of inner rotor turbine blades such that said support assembly supports the outer rotor forward end.

In a further aspect, a gas turbine engine is provided. The gas turbine engine includes an inner rotor comprising at least a first pair of adjacent rows of turbine blades that are configured to rotate in a first direction, a low-pressure turbine outer rotor including a forward end, an aft end, and at least one row of turbine blades that is rotatably coupled between the first pair of inner rotor turbine blades, wherein the at least one row of outer rotor turbine blades is configured to rotate in a second direction that is opposite the first direction, and a support assembly coupled between the first pair of inner rotor turbine blades such that said support assembly supports the outer rotor forward end.

DETAILED DESCRIPTION OF THE INVENTION

Figure 1:
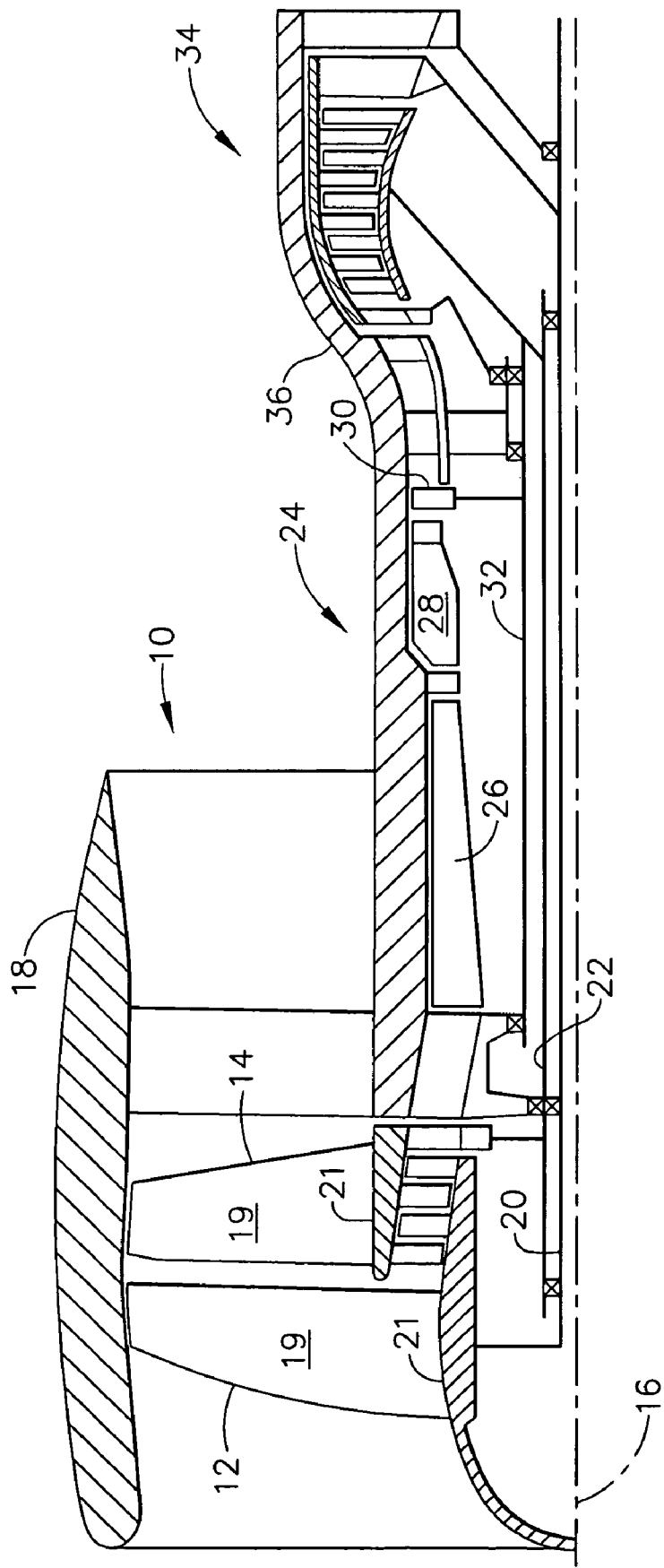
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
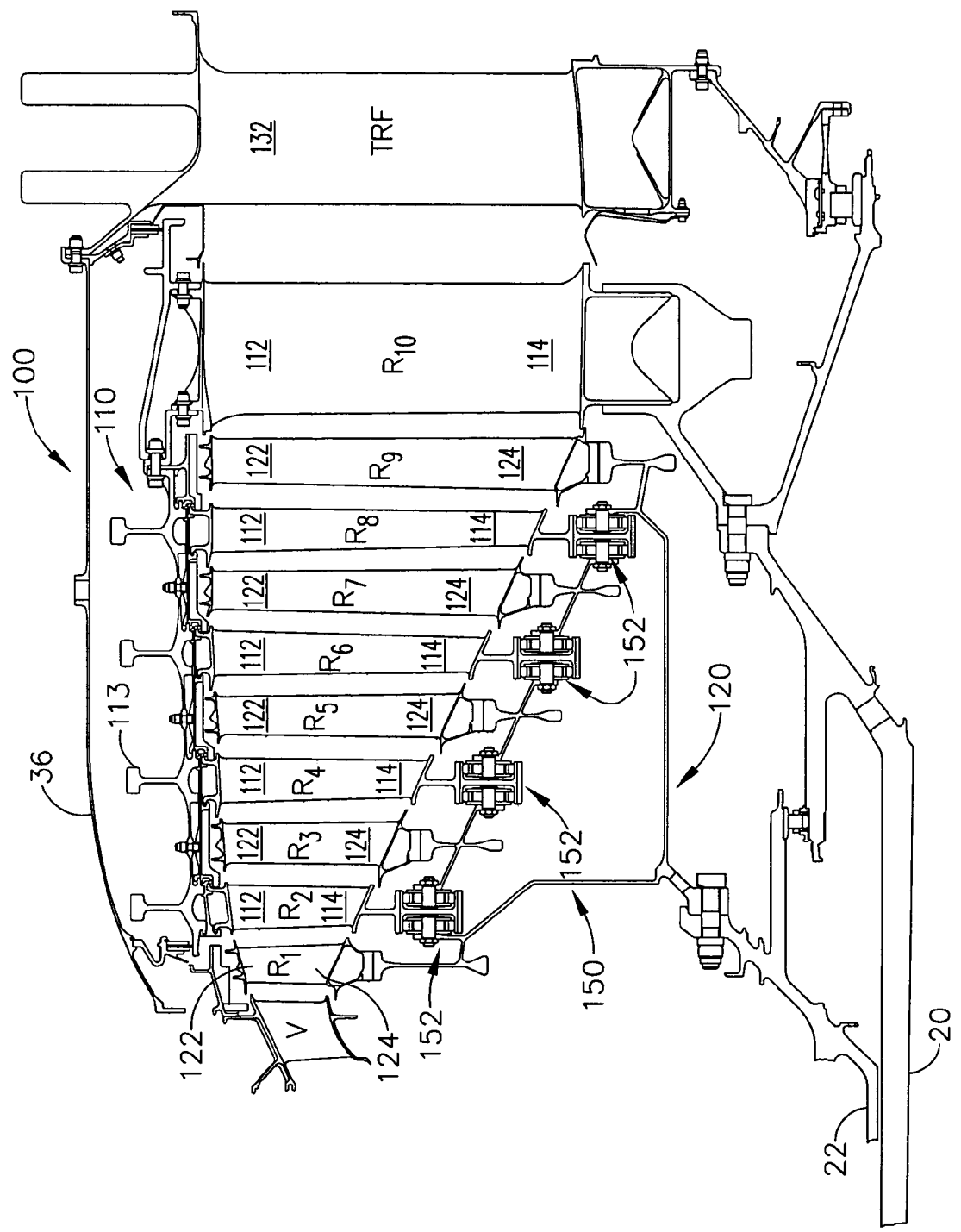
FIG. 2 is a schematic diagram of an exemplary counter-rotating low pressure turbine assembly that can be used with the gas turbine engine shown in FIG. 1.

FIG. 2 is a schematic diagram of a counter-rotating low-pressure turbine assembly 100 that may be used with a gas turbine engine similar to gas turbine engine 10 (shown in FIG. 1). In the exemplary embodiment, low-pressure turbine 100 includes a radially outer rotor 110 that is positioned radially inwardly of outer casing 36. Outer rotor 110 includes a plurality of circumferentially-spaced rotor blades 112 that extend radially inwardly from a rotating casing 113. More specifically, rotor blades 112 are coupled to casing 113 to form outer rotor 110. Blades 112 are arranged in axially-spaced rows 114. Although, the exemplary embodiment illustrates only four rows 114 of blades 112, it should be realized that outer rotor 110 may have any quantity of rows 114 of blades 112 without affecting the scope of the method and apparatus described herein.

Low-pressure turbine assembly 100 also includes a radially inner rotor 120 that is aligned substantially coaxially with respect to, and radially inward of, outer rotor 110. Inner rotor 120 includes a plurality of circumferentially-spaced rotor blades 122 that extend radially outwardly and are arranged in axially-spaced rows 124. Although, the exemplary embodiment illustrates only four rows 124 of blades 122, it should be realized that inner rotor 120 may have any quantity of rows 124 of blades 122 without affecting the scope of the method and apparatus described herein.

In the exemplary embodiment, at least a portion of inner rotor blades 122 are axially-interdigitated with at least a portion of outer rotor blades 112 such that at least a portion of inner rotor rows 124 extend between respective outer rotor rows 114. Rotor blades 112 and 122 are therefore configured for counter-rotation of the rotors 110 and 120. In the exemplary embodiment, low-pressure turbine assembly 100 includes a stationary annular turbine rear-frame 132 that is coupled axially aft of low-pressure turbine outer and inner blades 112 and 122.

Low-pressure turbine assembly 100 also includes an outer rotor support assembly 150 that is coupled to at least one of plurality of outer blades 112. In the exemplary embodiment, support system 150 includes at least one support member 152 coupled to a respective blade 112 using a member 154.

Figure 3:
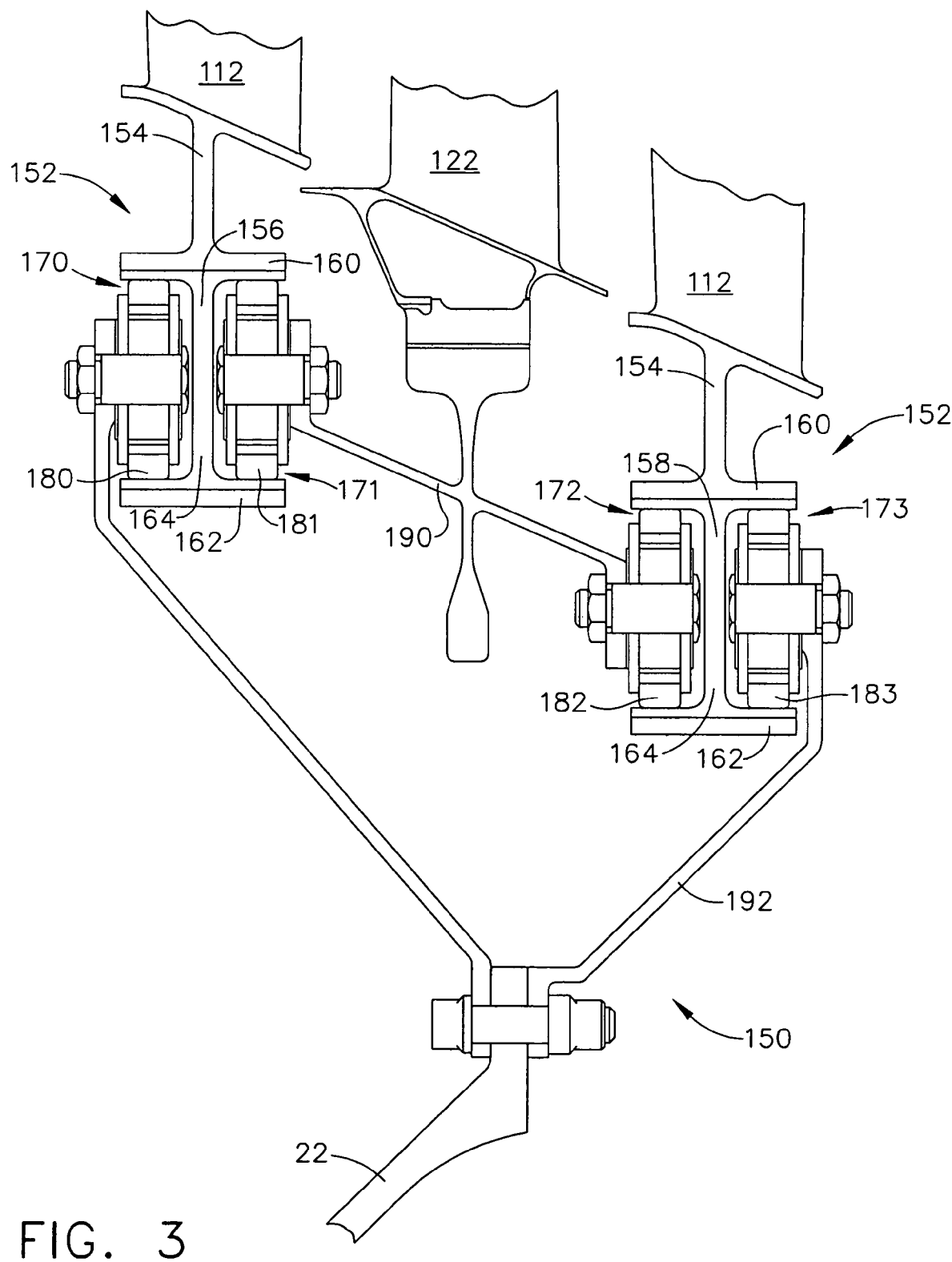
FIG. 3 is a schematic diagram of a portion of the low pressure turbine assembly shown in FIG. 2.

FIG. 3 is a schematic illustration of a portion of support system 150 that may be used with low-pressure turbine assembly 100. In the exemplary embodiment, support system 150 includes at least a first support member 156 and a second support member 158. Each support member 156 and 158 includes a first portion 160, a second portion 162, and a third portion 164 that extends between the first and second portions 160 and 162, respectively, such that a substantially I-beam shaped support member 156 and 158 is defined. Accordingly, each support member 156 and 158 includes a first channel 170 and 172 respectively, and a second channel 171 and 173 respectively, that are each defined by an external surface of first portion 160, second portion 162, and third portion 164. Each support member 156 and 158 also includes a first bearing 180 and 182 respectively, that is rotatably positioned within respective channels 170 and 172, and a second bearing 181 and 183 that is positioned within respective channels 171 and 173.

In the exemplary embodiment, support system 150 also includes a shaft 190 that is rotatably coupled between second bearing 181 that is positioned within second channel 171 of support member 156 to first bearing 182, that is positioned within first channel 172 of support member 158, such that second bearing 181 is rotatably coupled to first bearing 182 and to blade 122. More specifically, at least one row of inner rotor turbine blades 122 is positioned between adjacent outer rotor turbine blades 112, and is coupled to shaft 190. Accordingly, and in the exemplary embodiment, at least one row of inner rotor turbine blades 122 facilitates providing structural support to at least one row of outer rotor turbine blades 112. Although only two support members 156 and 158 are illustrated, it should be realized that gas turbine engine 10 can include only a single support member 152 that is rotatably coupled to a single rotor blade 122, or alternatively can include a plurality of support members 152 that are rotatably coupled to a plurality of rotor blades 122, such that support members 152 are spaced circumferentially about an inner periphery of low-pressure turbine assembly 100.

In the exemplary embodiment, support system 150 also includes a shaft 192 that rotatably couples first bearing 180 that is positioned within first channel 170 of support member 156 to second bearing 183 that is positioned within second channel 173 of support member 158 such that first bearing 180 is rotatably coupled to second bearing 183 and to shaft 192. In the exemplary embodiment, shaft 192 is also rotatably coupled to aft fan assembly 14 (shown in FIG. 1) via shaft 22. Shaft 190 is also rotatably coupled to shaft 192 via support members 156 and 158 respectively.

In the exemplary embodiment, during engine operation, a radial force generated during rotation of outer rotor 110 is transmitted to inner rotor 120 via support system 150. More specifically, as outer rotor 110 rotates, rotational torque from at least one outer rotor blade 112 is transmitted to at least one row of inner rotor turbine blades 122 via shaft 190 through bearings 180, 181, 182, and/or 183 respectively. Bearings 180, 181, 182, and/or 183 facilitate reducing radial movement of outer rotor 110. Moreover, because shafts 190 and 192 are rotatably coupled to adjacent outer rotor blades 112 via bearings 180, 181, 182, and/or 183, outer rotor 110 maintains a relatively constant radial position with respect to outer casing 36. In addition, as outer rotor 110 is forced radially outward during operation, because at least one outer rotor blade 112 is rotatably coupled to at least one inner rotor blade 122, radial movement of outer rotor 110 is transmitted to inner rotor 120 such that low-pressure turbine 34 is maintained in a relatively constant radial position with respect to outer casing 36.

Figure 4:
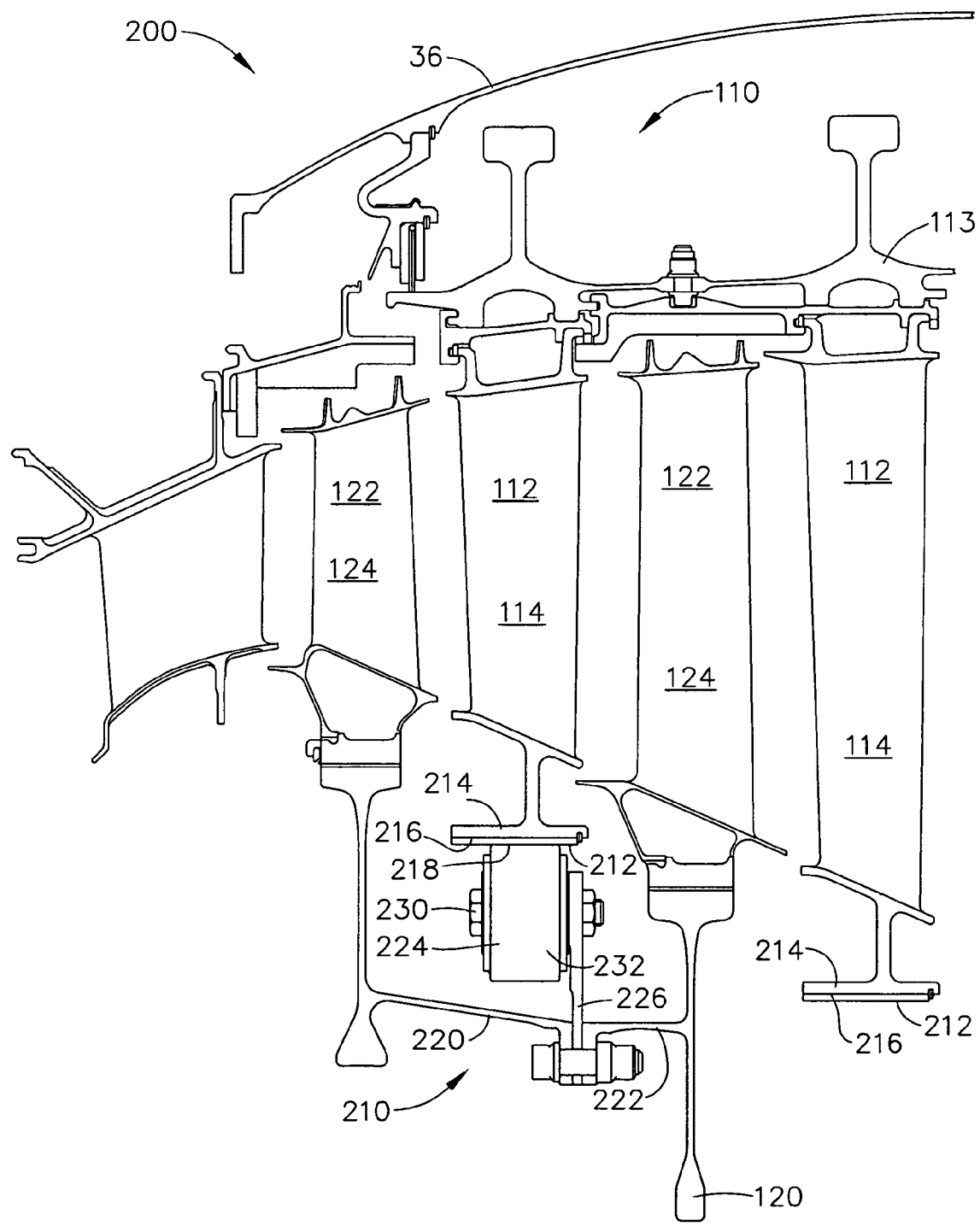
FIG. 4 is a schematic diagram of a portion of an exemplary counter-rotating low pressure turbine assembly that can be used with the gas turbine engine shown in FIG. 1.

FIG. 4 is a schematic diagram of a portion of counter-rotating low-pressure turbine assembly 200 that may be used with a gas turbine engine similar to gas turbine engine 10 (shown in FIG. 1). In the exemplary embodiment, low-pressure turbine 200 is substantially similar to low-pressure turbine assembly 100 (shown in FIG. 2), and components of low-pressure turbine assembly 100 that are identical to components of low-pressure turbine 200 are identified in FIG. 4 using the same reference numerals used in FIG. 2.

In the exemplary embodiment, low-pressure turbine 200 includes a radially outer rotor 110 that is positioned radially inwardly of outer casing 36. Outer rotor 110 includes a plurality of circumferentially-spaced rotor blades 112 that extend radially inwardly from a rotating casing 113. More specifically, rotor blades 112 are coupled to casing 113 to form outer rotor 110. Blades 112 are arranged in axially-spaced rows 114. Although, the exemplary embodiment illustrates only two rows 114 of blades 112, it should be realized that outer rotor 110 may have any quantity of rows 114 of blades 112 without affecting the scope of the methods and/or apparatus described herein.

Low-pressure turbine 200 also includes a radially inner rotor 120 that is aligned substantially coaxially with respect to, and radially inward from outer rotor 110. Inner rotor 120 includes a plurality of circumferentially-spaced rotor blades 122 that extend radially outwardly and are arranged in axially-spaced rows 124. Although, the exemplary embodiment illustrates only two rows 124 of blades 122, it should be realized that inner rotor 120 may have any quantity of rows 124 of blades 122 without affecting the scope of the methods and/or apparatus described herein.

In the exemplary embodiment, at least a portion of inner rotor blades 122 are axially-interdigitated with at least a portion of outer rotor blades 112 such that at least a portion of inner rotor rows 124 extend between respective outer rotor rows 114. Rotor blades 112 and 122 are therefore configured for counter-rotation of the rotors 110 and 120. In the exemplary embodiment, low-pressure turbine 200 includes a stationary annular turbine rear-frame 132 (not shown) that is coupled axially aft of low-pressure turbine outer and inner blades 112 and 122.

Low-pressure turbine 200 also includes a support assembly 210 that is coupled to at least two adjacent inner rotor turbine blades 122, and a support ring 212 that is coupled to at least one row 114 of outer rotor turbine blades 112. More specifically, each outer rotor row 114 of blades 112 each include a platform 214. Blades 112 are arranged such that platforms 214 define a platform inner surface 216 that extends radially inward from rotor blades 112. Support ring 212 is coupled to platforms 214 to facilitate forming a relatively smooth support ring inner surface 218 that is radially inward from platforms 214. In the exemplary embodiment, support ring 212 has an outer circumference that is sized to enable support ring 212 to be positioned radially inward from platforms 214. Ring 212 extends 360 degrees around an inner periphery of low-pressure turbine 200.

In the exemplary embodiment, support system 210 also includes a first member 220, a second member 222, and a bearing 224 that is rotatably coupled between first and second member 220 and 222 respectively. More specifically, first member 220 is coupled to a first row 124 of turbine rotor blades 122 and second member 222 is coupled to a second row 124 of turbine rotor blades 122 that is adjacent to the first rotor row 124 of turbine rotor blades 122. Bearing 224 is then coupled to support members 220 and 222, respectively, using a connector 226. More specifically, bearing 224 is rotatably coupled to support members 220 and 222 using a fastener 230.

In the exemplary embodiment, during engine operation, radial forces generated during rotation of outer rotor 110 are transmitted to bearing 224 via support ring 212. More specifically, as outer rotor 110 rotates, an exterior surface 232 of each bearing 224 contacts support ring inner surface 218 such that radial movement of outer rotor 110 is facilitated to be reduced. Since each respective bearing 224 is coupled to two adjacent inner rotor blades 122 through support assembly 210, outer rotor 110 maintains a relatively constant radial position with respect to outer casing 36. More specifically, as outer rotor 110 is forced radially outward during operation, because each bearing 224 is attached to adjacent rotor blades 122, any radial movement of outer rotor 110 is transmitted to inner rotor 120 such that outer rotor 110 is maintained in a relatively constant radial position with respect to outer casing 36.

Accordingly, and in the exemplary embodiment, support assembly 210 facilitates providing structural support to at least one row of outer rotor turbine blades 112. Although only one support assembly 210 is illustrated, it should be realized that gas turbine engine 10 can include a plurality of support assemblies 210, wherein each respective support assembly is coupled between two adjacent rotor blades 122.

The exemplary embodiments described above illustrate a counter-rotating low-pressure turbine having an outer rotor that includes a first quantity of rows of blades and an inner rotor that includes the same quantity of rotor blades as the outer rotor. The outer rotor support assemblies described herein facilitate distributing the weight of outer rotor approximately equally between the turbine mid-frame and the turbine rear-frame. Accordingly, the size of the turbine mid-frame, the turbine rear-frame, and/or the last outer rotor stage can be reduced resulting in reduced production and assembly costs.

Exemplary embodiments of counter-rotating low-pressure turbines including outer rotor support assemblies are described above in detail. The components are not limited to the specific embodiments described herein, but rather, components of each system may be utilized independently and separately from other components described herein. The bearing assemblies described herein can also be used in combination with other known gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a low-pressure turbine inner rotor that includes at least a first pair of adjacent rows of inner rotor turbine blades that are configured to rotate in a first direction;

providing a low-pressure turbine outer rotor that includes a forward end, an aft end, and at least one row of outer rotor turbine blades that is rotatably coupled between the first pair of inner rotor turbine blades, wherein the at least one row of outer rotor turbine blades is configured to rotate in a second direction that is opposite the first direction;

coupling a support assembly between the first pair of inner rotor turbine blades such that the support assembly supports the outer rotor forward end;

coupling a support ring to a first row of the at least one row of outer rotor turbine blades; and rotatably coupling at least one bearing to the support assembly such that the at least one bearing rotatably supports the support ring.

2. A method in accordance with claim 1 wherein coupling a support assembly between the first pair of inner rotor turbine blades further comprises:

coupling a first member to a first row of the inner rotor turbine blades;

coupling a second member to a second row of the inner rotor turbine blades; and rotatably coupling a bearing to the first member and the second member to support the outer rotor forward end.

3. A method in accordance with claim 1 wherein coupling a support assembly between the first pair of inner rotor turbine blades further comprises:

coupling a first member to a first row of the outer rotor turbine blades;

coupling a first bearing to the first member;

coupling a second member to a second row of the outer rotor turbine blades; and coupling a second bearing to the second member and the first member to support the outer rotor forward end.

4. A method in accordance with claim 3 further comprising coupling a shaft between the first bearing and the second bearing.

5. A method in accordance with claim 4 further comprising coupling the shaft to the at least one row of inner rotor turbine blades.

6. A counter-rotating low-pressure turbine comprising:
an inner rotor comprising at least a first pair of adjacent rows of inner rotor turbine blades that are configured to rotate in a first direction;
an outer rotor comprising a forward end, an aft end, and at least one row of outer rotor turbine blades that is rotatably coupled between said first pair of inner rotor turbine blades, wherein said at least one row of outer rotor turbine blades is configured to rotate in a second direction that is opposite the first direction; and
a support assembly coupled between said first pair of inner rotor turbine blades such that said support assembly supports said outer rotor forward end;
a first member coupled to a first row of said inner rotor turbine blades;
a second member coupled to a second row of said inner rotor turbine blades: and
a bearing rotatably coupled to said first member and said second member and configured to support said outer rotor forward end.

7. A counter-rotating low-pressure turbine in accordance with claim 6 further comprising:
a support ring coupled to said at least one row of said outer rotor turbine blades; and
at least one bearing rotatably coupled to said support assembly such that said at least one bearing rotatably supports said support ring.

8. A counter-rotating low-pressure turbine in accordance with claim 6 wherein said support assembly further comprises:
a first member coupled to a first row of said outer rotor turbine blades; and
a first bearing rotatably coupled to said first member and configured to support said outer rotor forward end.

9. A counter-rotating low-pressure turbine in accordance with claim 8 further comprising:
a second member coupled to a second row of said outer rotor turbine blades; and
a second bearing rotatably coupled to said second member and said first member.

10. A counter-rotating low-pressure turbine in accordance with claim 9 further comprising a shaft rotatably coupled between said first bearing and said second bearing.

11. A counter-rotating low-pressure turbine in accordance with claim 10 wherein said first member comprises a first channel and said second member comprises a second channel, said first bearing rotatably coupled within said first channel and said second bearing rotatably coupled within said second channel.

12. A counter-rotating low-pressure turbine in accordance with claim 11 wherein said shaft is coupled to said at least one row of inner rotor turbine blades.

13. A gas turbine engine comprising:
a low-pressure turbine inner rotor comprising at least a first pair of adjacent rows of inner rotor turbine blades that are configured to rotate in a first direction;
a low-pressure turbine outer rotor comprising a forward end, an aft end, and at least one row of outer rotor turbine blades that is rotatably coupled between said first pair of inner rotor turbine blades, wherein said at least one row of outer rotor turbine blades is configured to rotate in a second direction that is opposite the first direction; and
a support assembly coupled between said first pair of inner rotor turbine blades such that said support assembly supports said outer rotor forward end;
a first member counted to a first row of said outer rotor turbine blades;
a first bearing rotatably coupled to said first member and configured to support said outer rotor forward end;
a second member coupled to a second row of said outer rotor turbine blades; and
a second bearing rotatably coupled to said second member and said first member.

14. A gas turbine engine in accordance with claim 13 further comprising:
a support ring coupled to said at least one row of said outer rotor turbine blades; and
at least one bearing rotatably coupled to said support assembly such that said at least one bearing rotatably supports said support ring.

15. A gas turbine engine in accordance with claim 13 wherein said support assembly comprises:
a first member coupled to a first row of said inner rotor turbine blades;
a second member coupled to a second row of said inner rotor turbine blades; and
a bearing rotatably coupled to said first member and said second member and configured to support said outer rotor forward end.

16. A gas turbine engine in accordance with claim 13 further comprising a shaft rotatably coupled between said first bearing and said second bearing.

17. A gas turbine engine in accordance with claim 16 wherein said shaft is coupled to said at least one row of said inner rotor turbine blades.

* * * * *

UNITED STATES PATENT AND TRADEMARK OFFICE
CERTIFICATE OF CORRECTION

PATENT NO. : 7,186,073 B2 Page 1 of 1
APPLICATION NO. : 10/976525
DATED : March 6, 2007
INVENTOR(S) : Orlando et al.

It is certified that error appears in the above-identified patent and that said Letters Patent is hereby corrected as shown below:

In Claim 13, column 8, line 18, delete "counted" and insert therefor -- coupled --.

Signed and Sealed this

Eighteenth Day of September, 2007

JON W. DUDAS
*Director of the United States Patent and Trademark Office*